US012603708B2

(12) United States Patent
Tulip et al.

(10) Patent No.: US 12,603,708 B2
(45) Date of Patent: Apr. 14, 2026

(54) LASER GAS SENSOR WITH EXPLOSION PROOF ENCLOSURE

(71) Applicant: Boreal Laser Inc., Edmonton (CA)

(72) Inventors: John Tulip, Edmonton (CA); Timothy Ho, Edmonton (CA)

(73) Assignee: Boreal Laser Inc., Edmonton (CA)

( * ) Notice: Subject to any disclaimer, the term of this patent is extended or adjusted under 35 U.S.C. 154(b) by 87 days.

(21) Appl. No.: 18/643,834

(22) Filed: Apr. 23, 2024

(65) Prior Publication Data

US 2025/0330245 A1 Oct. 23, 2025

(30) Foreign Application Priority Data

Apr. 22, 2024 (CA) ...................................... 3236011

(51) Int. Cl.
*H04B 10/40* (2013.01)
*G01N 21/39* (2006.01)

(52) U.S. Cl.
CPC ............. *H04B 10/40* (2013.01); *G01N 21/39* (2013.01); *G01N 2021/399* (2013.01); *G01N 2201/0236* (2013.01); *G01N 2201/0633* (2013.01); *G01N 2201/0636* (2013.01)

(58) Field of Classification Search
CPC .. H04B 10/40; G01N 21/39; G01N 2021/399; G01N 2201/0236; G01N 2201/0633; G01N 2201/0636
USPC ...................................................... 356/437
See application file for complete search history.

(56) References Cited

U.S. PATENT DOCUMENTS

| | | | |
|---|---|---|---|
| 6,750,467 B2 | 6/2004 | Tulip | |
| 8,053,728 B2 | 11/2011 | Chrzan et al. | |
| 8,164,748 B1 | 4/2012 | Flanders et al. | |
| 9,546,950 B2 | 1/2017 | Schachinger | |
| 10,267,723 B1* | 4/2019 | Saaski | G01N 15/1404 |
| 11,079,316 B2 | 8/2021 | Helbley et al. | |
| 11,391,667 B2 | 7/2022 | Tulip | |
| 2013/0086977 A1* | 4/2013 | Wong | G01J 5/045 |
| | | | 73/31.05 |

OTHER PUBLICATIONS

Boreal Laser Inc., "How the Remote Point (RPX) Probe Assembly Works;" downloaded from: https://web.archive.org/web/20201025184522/https://boreal-laser.com/products/remote-point-rpx-probe; Oct. 25, 2020 snapshot; 1 page.

* cited by examiner

*Primary Examiner* — Md M Rahman
(74) *Attorney, Agent, or Firm* — CHRISTENSEN O'CONNOR JOHNSON KINDNESS PLLC

(57) ABSTRACT

A gas sensing laser transceiver that may be used for sensing gas in explosive environments has a laser light source and electronic analysis equipment within an explosion proof chamber. The explosion proof chamber has an optical coupling allowing a laser output from the laser light source to exit the explosion proof chamber. The laser output travels along a path from the transceiver through a region in which a gas is to be detected and back to a photodetector. The photodetector may be intrinsically safe. A light concentrating optic located outside the explosion proof chamber, for example in a separate intrinsically safe chamber, may collect the incoming light and direct it to the photodetector.

10 Claims, 1 Drawing Sheet

LASER GAS SENSOR WITH EXPLOSION PROOF ENCLOSURE

TECHNICAL FIELD

This application relates to optical gas sensors that may be used in explosive environments.

BACKGROUND

Gas detection, for example detection of gas leaks or other sources of gas, in environments classified as explosive requires safety certification. Historically, in the art of safe gas sensing in explosive environments the preferred method is to enclose active electrical parts of a sensor in an explosion proof enclosure. "Explosion proof" is a term commonly used in the art of electrical equipment safety regulation and certification indicating that ignition within the enclosure will be contained and will not propagate into the environment surrounding the enclosure. Another term used in this art is "intrinsically safe", meaning the electrical equipment cannot trigger ignition in the first place. However, making a component intrinsically safe becomes increasingly difficult as the power required for the component increases.

In the art of long open path gas sensing there are primarily two sensor types. The first type is known in the art of gas detection as a transmitter/receiver or "pitch/catch". In this the light generating and light detecting means are disposed at either end of the optical axis. The optical analysis means is typically disposed close to the light detector. The second type is known in the art as a transceiver. In a transceiver the light generating, light detection, and optical absorption analysis means are closely disposed to each other at one end of the optical axis. A reflector such as a retroreflector is disposed at the other end of the optical axis.

A transceiver is preferred, for example, for long open path Fourier Transform Infrared (FTIR) sensors and tunable diode laser long open path gas sensors. These technologies are typically deployed to analyze atmospheric contamination of large open areas. A transmitter/receiver is, for example, preferred for non-dispersive infrared (NDIR) and tunable diode laser (TDL) sensors deployed for long open path gas leak detection. Long path FTIR systems use transceiver architecture. NDIR systems use transmitter/receiver architecture, are insensitive, and are limited to Lower Explosive Limit (LEL) leak detection. Open path TDL transmitter/receiver systems are limited to relatively short open paths. Boreal Laser uses a transceiver for both long and short paths and a large range of gas concentration.

The transceiver has several advantages over the transmitter/receiver. The reflector is typically a retroreflector array and the area of this array may be arbitrarily enlarged to compensate for movement of the optical beam caused by thermal and atmospheric steering of the light generation means. Also, thermal, or atmospheric movement of a retroreflector array does not cause steering of the reflected optical beam. In contrast the transmitter/receiver light detectors have a limited optical collection area and both the light generator and light detector must be aligned with the optical axis. This limits the length of the optical path and the mounting of both the light generator and detector means must have very stable mounting. Unlike the transceiver where all parts of the sensor are disposed in proximity to each other, parts of the transmitter/receiver particularly if a long open path is used are disposed remotely to each other and long electrical communication is necessary. To avoid the complexity of long electrical communication some transmitter/receivers have wireless communication between parts of the gas sensor even though this introduces other issues.

Typically, both the transmitter and receiver of transmitter/receiver sensors intended for use in environments classed as explosive are enclosed in explosion proof enclosures. The use of laser transceivers for leak detection in environments classified as explosive has been limited. In the art of tunable diode laser gas detection, optical windows are desired to be thin because etalon interference fringes created by thick windows degrade sensor performance. The optical detection aperture of a transceiver is relatively large and a correspondingly large optical window is required for good performance. Explosion proof instrument practice requires that an enclosure window must be sufficiently thick to withstand the pressure of an explosion within the enclosure. The larger the window, the higher the thickness required to withstand such pressure. Requirements for an explosion proof optical window and a laser gas sensing window for good performance are consequently incompatible and mounting a laser transceiver in an explosion proof enclosure is impractical.

Long open path atmospheric optical gas sensors comprise light generating means, light detection means, and optical analysis means. Light generating means comprises a light source that is typically an optical lamp or laser source, light collimation optics and steering apparatus to pass the light beam along a defined optical axis. Light detection means comprises a photodetection apparatus, light concentrating optics to concentrate light from the optical path onto the photodetector and steering apparatus to align the detection apparatus with the defined optical axis. Optical analysis means comprises electrical inputs from both the light generator and light detection, amplification and electronic analysis means to calculate the spectrum of gases in the optical path.

SUMMARY

There is provided a gas sensing laser transceiver comprising a housing, an explosion proof enclosure within the housing; an intrinsically safe chamber within the housing; a laser light source within the explosion proof enclosure, the laser light source having a laser output; the intrinsically safe chamber having an optical aperture connecting the intrinsically safe chamber to the outside of the housing; an optical coupling within a wall separating the explosion proof chamber from the intrinsically safe chamber, the optical coupling being arranged to allow the laser output to exit the explosion proof chamber and enter the intrinsically safe chamber as outgoing laser light, and to proceed out of the intrinsically safe chamber through the optical aperture and along a path from the transceiver through a region in which a gas is to be detected, to a reflector, and back to the transceiver to return into the intrinsically safe chamber through the optical aperture as incoming laser light; a light concentrating optic mounted in the intrinsically safe chamber to receive the incoming laser light returning into the intrinsically safe chamber through the optical aperture; and a photodetector within the intrinsically safe chamber and arranged to receive the incoming laser light after concentration by the light concentrating optic.

In various embodiments, there may be included any one or more of the following features: the photodetector may be an intrinsically safe photodetector. The photodetector may be connected to an interior wall of the intrinsically safe chamber; a collimating element either inside (preferred embodiment) or outside the explosion proof chamber for collimating the laser output exiting the explosion proof chamber via the optical coupling; the collimating element may be a lens; the optical coupling may direct the outgoing laser light through a hole in the light concentrating optic; the optical coupling may be a first optical window; the optical aperture may be a second optical window; a gas analyzer and communications equipment within the explosion safe chamber; and the reflector may be a retroreflector, such as a retroreflector array.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
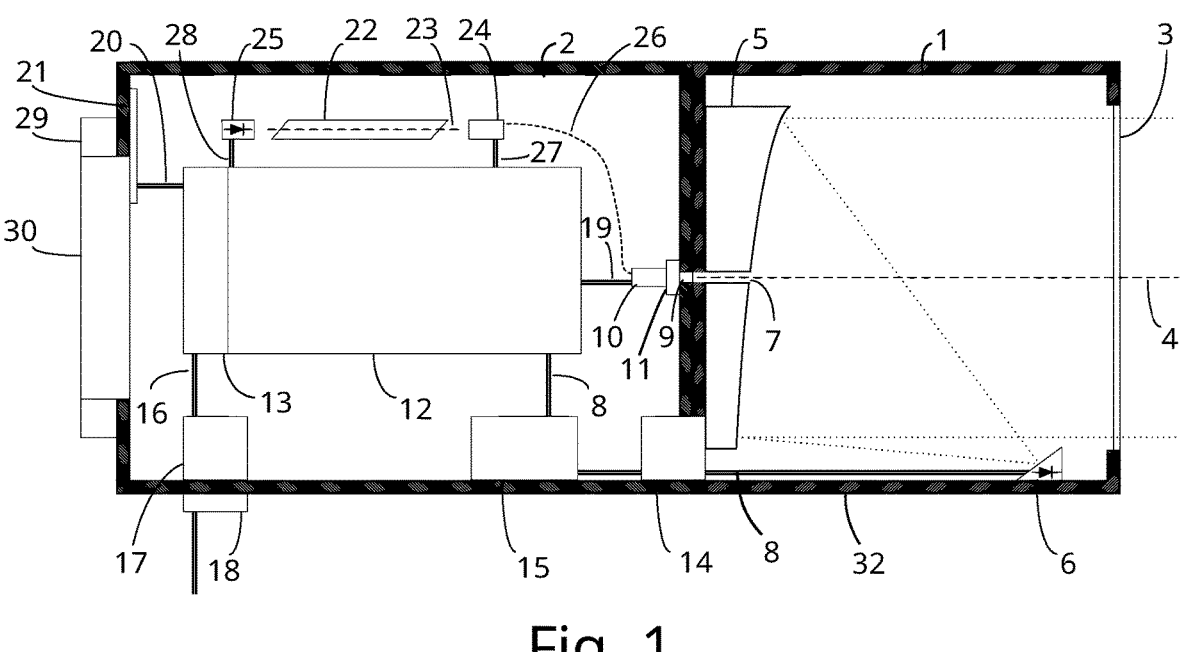
FIG. 1 is a schematic drawing of an example laser gas sensor.

A gas sensing laser transceiver that may be used for sensing gas in explosive environments is shown in FIG. 1. The gas sensing laser transceiver has a housing 32. Within the housing is an explosion proof chamber 2. For ease of assembly, the housing may be formed of separate enclosures one of which defines the explosion proof chamber 2, as shown in FIG. 1. These separate enclosures are fixedly connected in use of the device. They are attached by mechanical means.

A laser light source 10 is located within the explosion proof chamber. The laser light source has a laser output. The laser light source may be, for example, a free space tunable diode laser, a fibre-optically coupled tunable diode laser such as a semiconductor distributed-feedback (DFB) laser.

An optical coupling 9 within a wall defining the explosion proof chamber is arranged to allow the laser output to exit the explosion proof chamber. The optical coupling 9 may be, for example, an explosion proof thin optical window with a small aperture (the use of a small thin XP window is part of the patentability argument)

Figure 2:
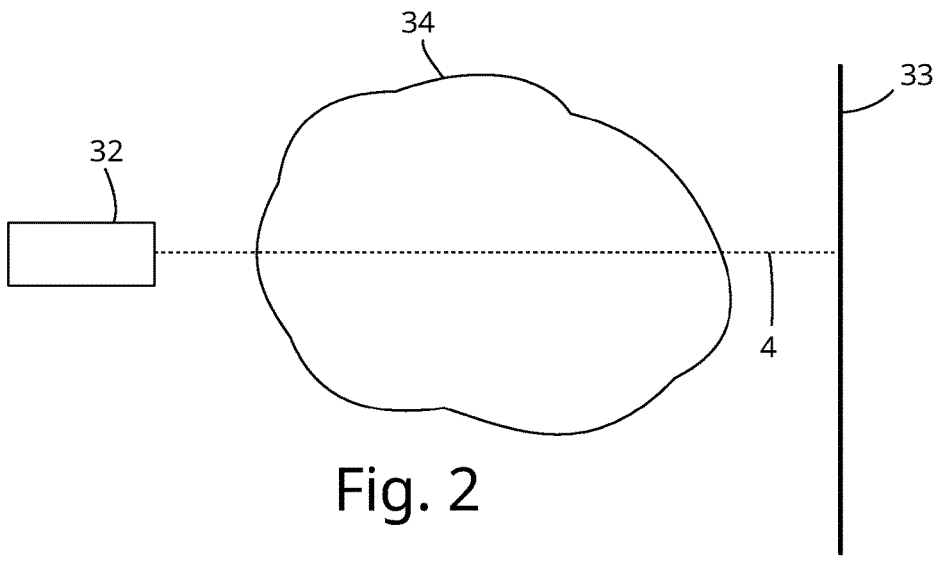
FIG. 2 is a schematic drawing of a laser gas sensor and a retroreflector.

As schematically shown in FIG. 2, the laser output travels along a path from the transceiver through a region 34 in which a gas is to be detected, to a retroreflector 33 and back to the transceiver. In principle any light reflector (e.g., including a planar mirror) could be used to send the light back, but a retroreflector simplifies alignment. The laser light source 10 is preferably positioned so the laser light source 10 is aligned with an optical axis 4 defined such that the path of the laser output is aligned with the optical axis 4 as it exits the housing. Other optical elements of the laser gas sensor may be arranged in relation to this optical axis.

A light concentrating optic 5 may be located in the path to direct the laser output towards a photodetector 6. Light concentrating optic 5 may be, for example, a parabolic mirror or a lens. The light concentrating optic 5 may be positioned at the optical axis 4, to best receive a light beam returning from a retroreflector, which light beam lies on the optical axis and has a diameter determined by the retroreflector and is typically greater than the diameter of the collecting optics and the aperture of the intrinsically safe chamber (if present and discussed below). The alignment of the light concentrating optic is typically expected to direct the concentrated light away from the axis towards the photodetector, which may then be located off-axis. A light concentrating optic located off-axis (but close to the axis, not shown) could still be used with a retroreflector as the light from a retroreflector does have some spread instead of all being exactly on the optical axis. A non-retroreflector reflector (e.g. flat mirror) could also be used instead of a retroreflector and aimed to direct light to a light concentrating optic regardless of positioning relative to the optical axis.

The light concentrating optic may be positioned in a manner that would obstruct the path of the laser output as it exits the explosion proof chamber as shown in FIG. 1. In this case the light concentrating optic may have an optical opening 7 allowing the laser output to pass though the light concentrating optic. The optical opening, such as an aperture or a window in the light concentrating optic, may be located on and aligned with the optical axis.

The light concentrating optic is located to receive light travelling parallel to the defined optical axis 4. The photodetector 6 may be positioned at a focal point of the light concentrating optic such that the facet of the photodetector faces the light concentrating optic. In the arrangement shown in FIG. 1, the photodiode is attached in proximity to an interior wall defining the intrinsically safe chamber 1.

A photodetector 6 is located outside of the explosion proof chamber 2 to receive the laser output after passage of the laser output along the path. First electrical cable 8 extends from the photodetector into the explosion proof container through an explosion proof coupling 14 mounted in the wall of the explosion proof chamber. The laser light source and photodetector may be any of several laser light sources and photodetectors known in the art. The photodetector 6 may be, for example, a photodiode. All explosion proof couplings as shown may include, for example, explosion proof glands which exclude significant air gaps around the elements such as wires passing through the couplings.

A reflector such as retroreflector 33 may be positioned within or beyond the region in which the gas is to be detected to cause the laser output to return to the transceiver. The retroreflector 33 (lies on the optical axis) is in the laser output path and may be any kind of known retroreflector. In the art of laser gas sensing, laser light in the infrared region of the spectrum is typically used. Glass retroreflectors do not transmit infrared light so hollow retroreflectors are necessary for infrared light. Thin plastic retroreflector arrays such as those used in retroreflecting tape may be used for near infrared light A retroreflector is any reflector that reflects light substantially in the direction it came from, for a range of angles of incoming light. The retroreflector 33 may be, for example, a single retroreflector or a retroreflector array. The area of the retroreflector array may be enlarged to compensate for movement of the laser output caused by thermal and atmospheric steering of the laser light source and laser beam divergence In the claims, for clarity the term "outgoing" may be used to refer to light before it reaches the retroreflector and the term "incoming" may be used to refer to light returning from the retroreflector.

A collimating element 11 to collimate the laser output, for example one or more laser collimating lenses, may be positioned in the path. The collimating element may be positioned within or outside the explosion proof chamber. The collimating element may be positioned next to the optical coupling 9. Other means for steering the laser output may be provided in the path.

As shown in FIG. 1 an intrinsically safe chamber 1 may also be included within the housing. Intrinsically safe here means that this chamber 1 is not explosion proof so the components it contains must be intrinsically safe or otherwise prevented from causing an explosion within the chamber. This chamber may be formed, as shown in FIG. 1, as a separate enclosure connected to the explosion proof chamber 2 in use, but a unitary housing (not shown) could also be formed to include both this chamber 1 and the explosion proof chamber 2. One or more of the photodetector 6, first electrical cable 8, light concentrating optic 5 and collimating element 11 may be located within the intrinsically safe chamber 1.

The intrinsically safe chamber has an optical aperture 3 for allowing the laser output to travel into and out of the intrinsically safe chamber. The optical aperture may be, a thin window that does not cause optical etalon interference. The optical aperture may be normal to the defined optical axis 4 and may be aligned with the collimating element 11. The optical aperture 3 may be, as shown in FIG. 1, much larger than the collimating element 11 in order to have greater area for receiving light returning from the retroreflector 11. The optical aperture may also be larger in diameter than the light concentrating optic, in order to maximize collection of light returned from the retroreflector. An optical aperture may be formed of multiple smaller optical apertures at the cost of some loss of light.

The explosion proof chamber 2 and the intrinsically safe chamber 1 are optically coupled by the optical coupling 9 allowing the laser output to exit the explosion proof chamber. Optical coupling 9 may be located within a wall defining the intrinsically safe chamber to allow the laser output to travel into the intrinsically safe chamber from the explosion proof chamber. The optical coupling may be, in one embodiment, a window. A thin window may be preferred for optical reasons; therefore, in order to preserve the explosion proof properties of the explosion proof chamber 2, the window may have to be small to withstand an explosion. The laser, and if present the collimating element, may be placed near the window to allow light to exit even from a small window, but the small window would typically not receive much incoming light from the retroreflector, hence the receiving optical elements such as light concentrating optic 5 being located in the intrinsically safe chamber rather than the explosion proof chamber.

The light concentrating optic 5 may be positioned within the intrinsically safe chamber on a wall across from the optical aperture 3. Because they do not have to withstand an explosion, the optical aperture 3 and light concentrating optic 5 may be any size. In an example embodiment, they have 3" diameter. A diameter of 5" would collect more light, but a smaller size is used to keep down the overall size of the apparatus.

The photodetector 6 may be intrinsically safe. Generally, a photodiode is always intrinsically safe. If it is combined with a preamplifier it may not be intrinsically safe. The photodetector/amplifier could alternatively be placed within an explosion proof chamber, the same or different from the explosion proof chamber 2 containing the laser, with the light concentrating optic 5 focusing light on a narrow window (not shown) in the explosion proof chamber containing the photodetector. The light concentrating optic 5, first electrical cable 8 and collimating element 11 may be intrinsically safe. The photodetector may be connected to the housing 32.

One or more of the laser light source 10, photodetector 6, light concentrating optic 5, collimating element 11 and the retroreflector 33 may be in fixed positions relative to each other to maintain optical alignment of the parts to allow the transceiver to be used without time consuming adjustment. One or more of the laser light source, photodetector, light concentrating optic, and the collimating element may be affixed to the housing 32. The photodetector may be embedded in the wall defining the intrinsically safe chamber. The intrinsically safe chamber 1 and explosion proof chamber 2 may be defined by housing portions affixed to each other to form the housing 32.

Electrical analysis equipment and active electrical parts may be located within the explosion proof chamber 2 where possible to reduce the risk of ignition. The photodetector has an output that is transmitted to an electronic gas analyzer for analysis, for example using first electrical cable 8. There may be an electronic gas analyzer 12 and communication electronics 13 within the explosion proof chamber 2. The electronic gas analyzer 12 may be any of several known in the art. The electronic gas analyzer may include laser driving electronics and signal analysis electronics (not separately shown). First electrical cable 8 may connect the electronic gas analyzer 12 to the photodetector 6 through a second explosion proof coupling 14 in the wall of the explosion proof chamber. First electrical cable 8 may also pass through first electrical safety barrier 15.

Second electrical cable 16 may connect the communication electronics 13 to external data electronics through a third explosion proof coupling 17 within a wall defining the explosion proof chamber and a second electrical safety barrier 18. Optionally, a conductor carrying power to operate the device could be included with this cable such a cable, or a separate power input conductor (not shown) could be used. A battery could also be used, and could be charged using such a separate power input conductor, which may not need to use the same explosion proofing techniques if all charging occurs outside the explosion risk area. All conductors/cables shown may be, for example, coaxial cables.

Third electrical cable 19 may connect the electronic gas analyzer 12 with the laser light source 10. Fourth electrical cable 20 may connect the communication electronics 13 to a wireless communication antenna 21. The wireless communication antenna 21 may be within the explosion proof chamber. Depending on the embodiment, one of the wireless communication elements (20 and 21) and the wired communication elements (16-18 and external wire) may be omitted and communication handled by the other means. In principle, both could be omitted and data storage used instead under circumstances where real-time data is not needed.

A calibration cell 22 may be located within the explosion proof container. Calibration cell 22 may be, for example, a tube with optical windows filled with a target gas and defining a calibration optical axis 23 coaxial with an axis of the calibration cell. Calibration laser light source 24 and a calibration photodetector 25 may be located on the calibration optical axis. The calibration laser light source 24 may comprise fibre-optic 26 extending from the laser light source 10 carrying laser light output from the laser light source 10.

Fifth electrical cable 27 may connect the calibration laser light source 24 with the electronic gas analyzer 12. Sixth electrical cable 28 may connect the calibration photodetector 25 to the electronic gas analyzer 12.

There may be a removable inspection cap 29 in a wall defining the explosion proof chamber. Removable inspection cap 29 may comprise an explosion proof inspection window 30 with an explosionproof connection to the explosion proof chamber. The wireless communication antenna 21 may be mounted in wall of the explosion proof chamber or attached to the inspection window.

The various parts and associated circuitry located within the explosion proof chamber may not meet intrinsically safe standards to avoid the limitations of intrinsically safe standards on each part and circuitry.

The laser gas sensor may be a laser spectrometer.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A gas sensing laser transceiver comprising:
a housing;
an explosion proof chamber within the housing;
an intrinsically safe chamber within the housing;
a laser light source within the explosion proof chamber, the laser light source having a laser output;
the intrinsically safe chamber having an optical aperture connecting the intrinsically safe chamber to the outside of the housing;
a first optical window within a wall separating the explosion proof chamber from the intrinsically safe chamber, the first optical window being arranged to allow the laser output to exit the explosion proof chamber and enter the intrinsically safe chamber as outgoing laser light, and to proceed out of the intrinsically safe chamber through the optical aperture and along a path from the transceiver through a region in which a gas is detected, to a reflector, and back to the transceiver to return into the intrinsically safe chamber through the optical aperture as incoming laser light;
a light concentrating optic mounted in the intrinsically safe chamber to receive the incoming laser light returning into the intrinsically safe chamber through the optical aperture; and
a photodetector within the intrinsically safe chamber and arranged to receive the incoming laser light after concentration by the light concentrating optic.

2. The gas sensing laser transceiver of claim 1 in which the photodetector is an intrinsically safe photodetector connected to an interior wall of the intrinsically safe chamber.

3. The gas sensing laser transceiver of claim 1 further comprising a collimating element inside or outside the explosion proof chamber for collimating the outgoing laser light exiting the explosion proof chamber via the first optical window.

4. The gas sensing laser transceiver of claim 3 in which the collimating element is a lens.

5. The gas sensing laser transceiver of claim 1 in which the first optical window directs the outgoing laser light through an optical opening in the light concentrating optic.

6. The gas sensing laser transceiver of claim 1 in which the optical aperture is a second optical window.

7. The gas sensing laser transceiver of claim 1 further comprising a gas analyzer and communications equipment within the explosion safe chamber.

8. The gas sensing laser transceiver of claim 1 in which the reflector is a retroreflector.

9. The gas sensing laser transceiver of claim 8 in which the retroreflector is a retroreflector array.

10. The gas sensing laser transceiver of claim 1 in combination with the reflector.

* * * * *